United States Patent

Neier

[11] Patent Number: 5,143,310
[45] Date of Patent: Sep. 1, 1992

[54] COMBINED HAY PROCESSOR AND FEED MIXER

[75] Inventor: Benjamin R. Neier, Dodge City, Kans.

[73] Assignee: Roto-Mix Enterprises, Ltd., Dodge City, Kans.

[21] Appl. No.: 652,564

[22] Filed: Feb. 8, 1991

[51] Int. Cl.⁵ .............................................. B02C 19/22
[52] U.S. Cl. .................................. 241/101.8; 241/260.1
[58] Field of Search ................... 366/603; 241/101 A, 241/101 B, 101.7, 260.1

[56] References Cited

U.S. PATENT DOCUMENTS

| | | | |
|---|---|---|---|
| 2,656,122 | 10/1953 | Borner | 241/260.1 |
| 2,978,097 | 4/1961 | Blanshine | 241/260.1 X |
| 3,273,734 | 9/1963 | Schuler | |
| 3,370,796 | 2/1968 | Herr | |
| 3,968,998 | 7/1976 | Wolf | |
| 4,168,805 | 9/1979 | Taylor | |
| 4,182,592 | 1/1980 | Henryson | |
| 4,330,091 | 5/1982 | Rozeboom et al. | 241/101 B X |
| 4,506,990 | 3/1985 | Neier et al. | |
| 4,597,672 | 7/1986 | Neier et al. | |
| 4,741,625 | 5/1988 | Neier | |
| 4,756,626 | 7/1988 | Neier | |
| 4,951,883 | 8/1990 | Loppoli et al. | |

FOREIGN PATENT DOCUMENTS 1238751 6/1986 U.S.S.R. ............................... 366/603

*Primary Examiner*—Mark Rosenbaum
*Assistant Examiner*—John M. Husar
*Attorney, Agent, or Firm*—Zarley, McKee, Thomte, Voorhees & Sease

[57] ABSTRACT

A hay feed wall extends longitudinally of the mixer chamber with its lower edge closely adjacent to a chopper auger. A control wall extends laterally from a chamber side wall over the chopper auger to the feed wall to cause hay bales to be channeled into the chopper auger whereupon the hay is chopped by the knives on the outer peripheral edge of the auger flighting. The hay is then augered out of the chopping chamber into the mixing chamber where it is acted upon by a lower mixing auger and a rotor in the main chamber. The lower corner of the feed wall engages the lower portion of the control wall to pivot the control wall to a substantially vertical position as the feed wall is pivoted to that position by opertion of a cable connected to a winch.

20 Claims, 4 Drawing Sheets

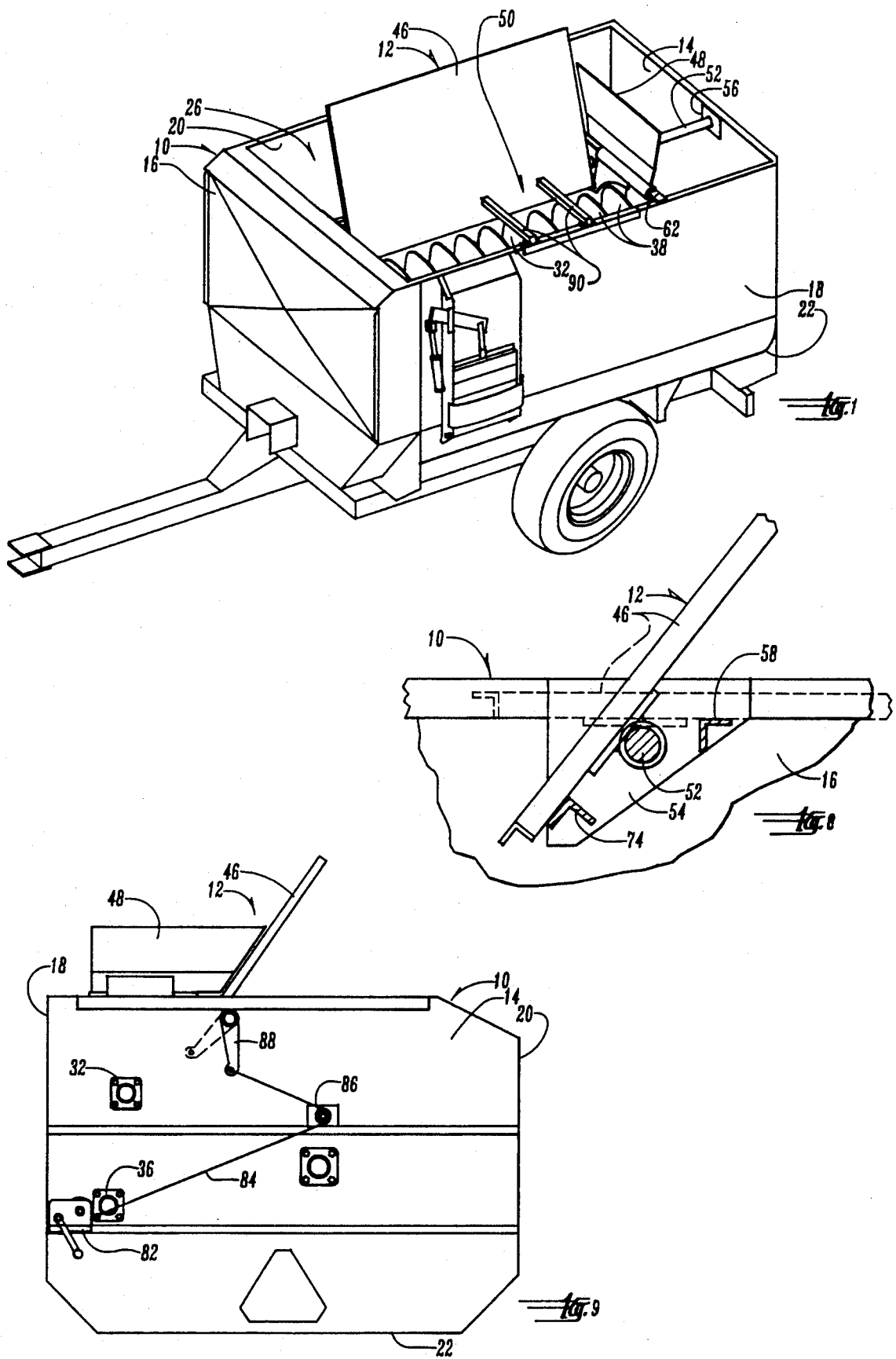

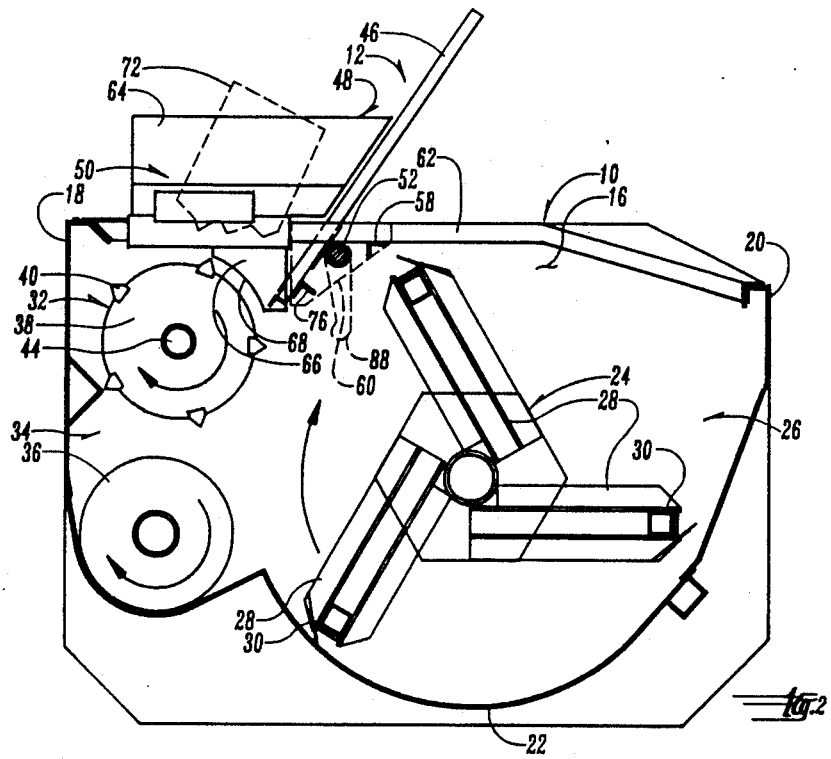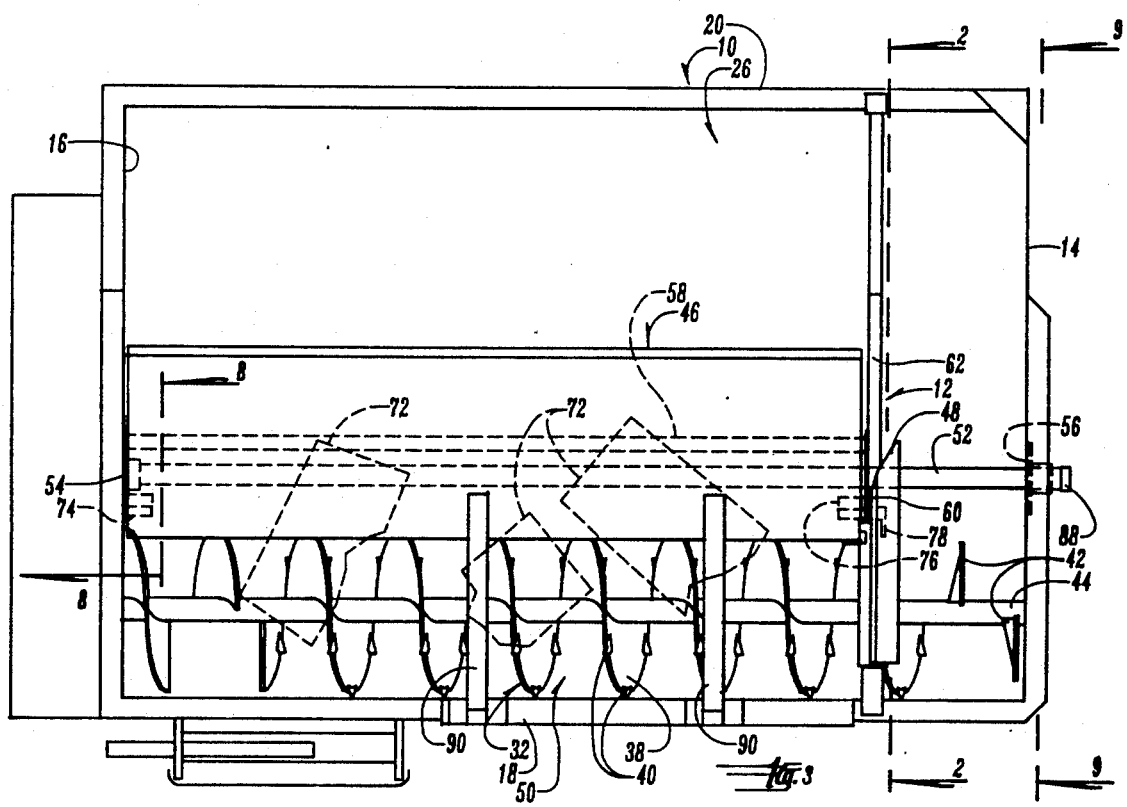

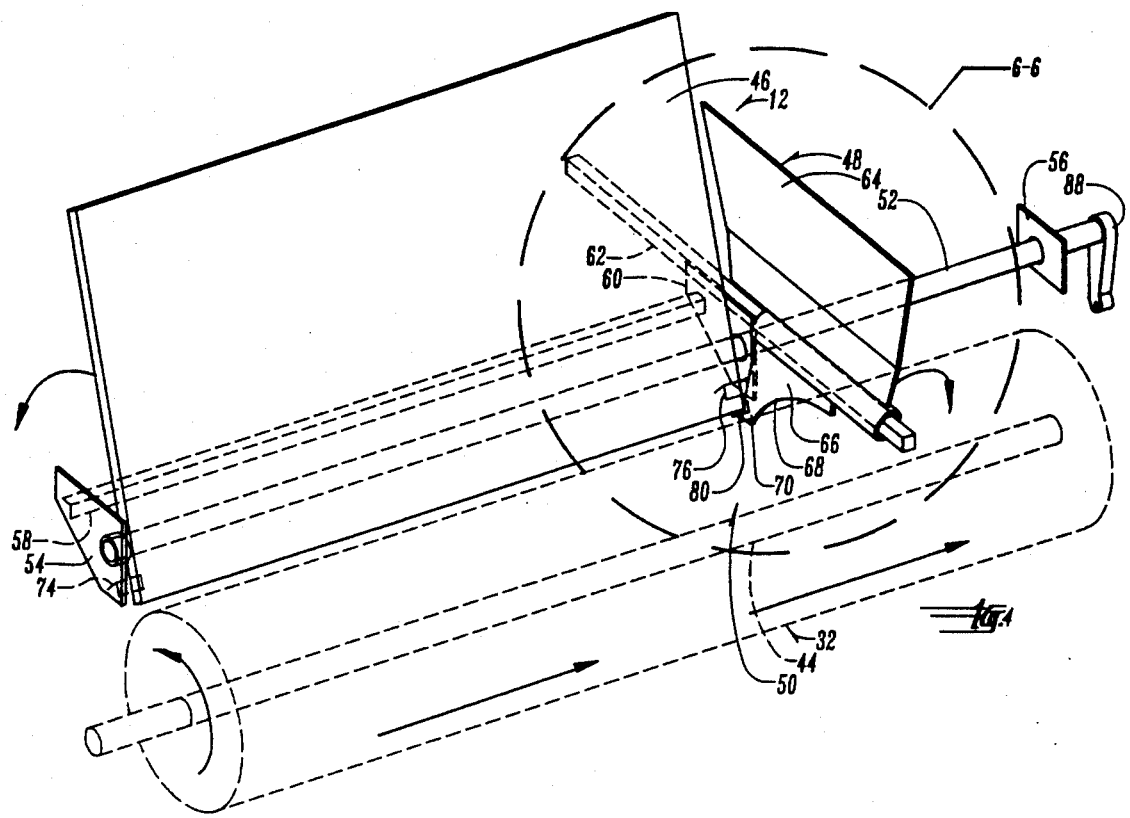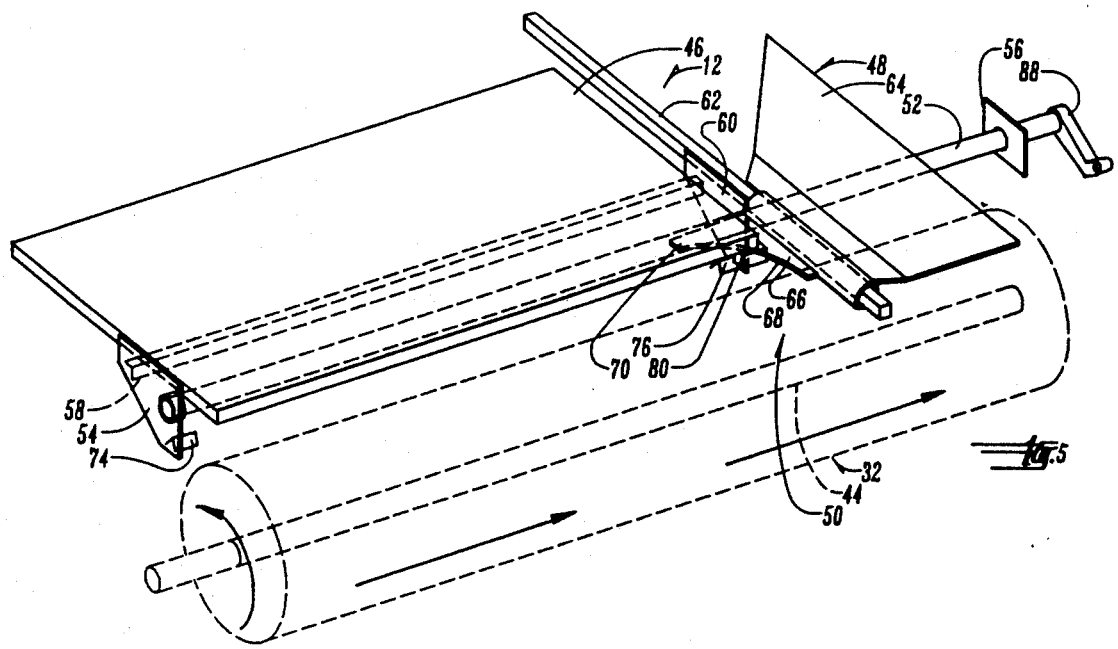

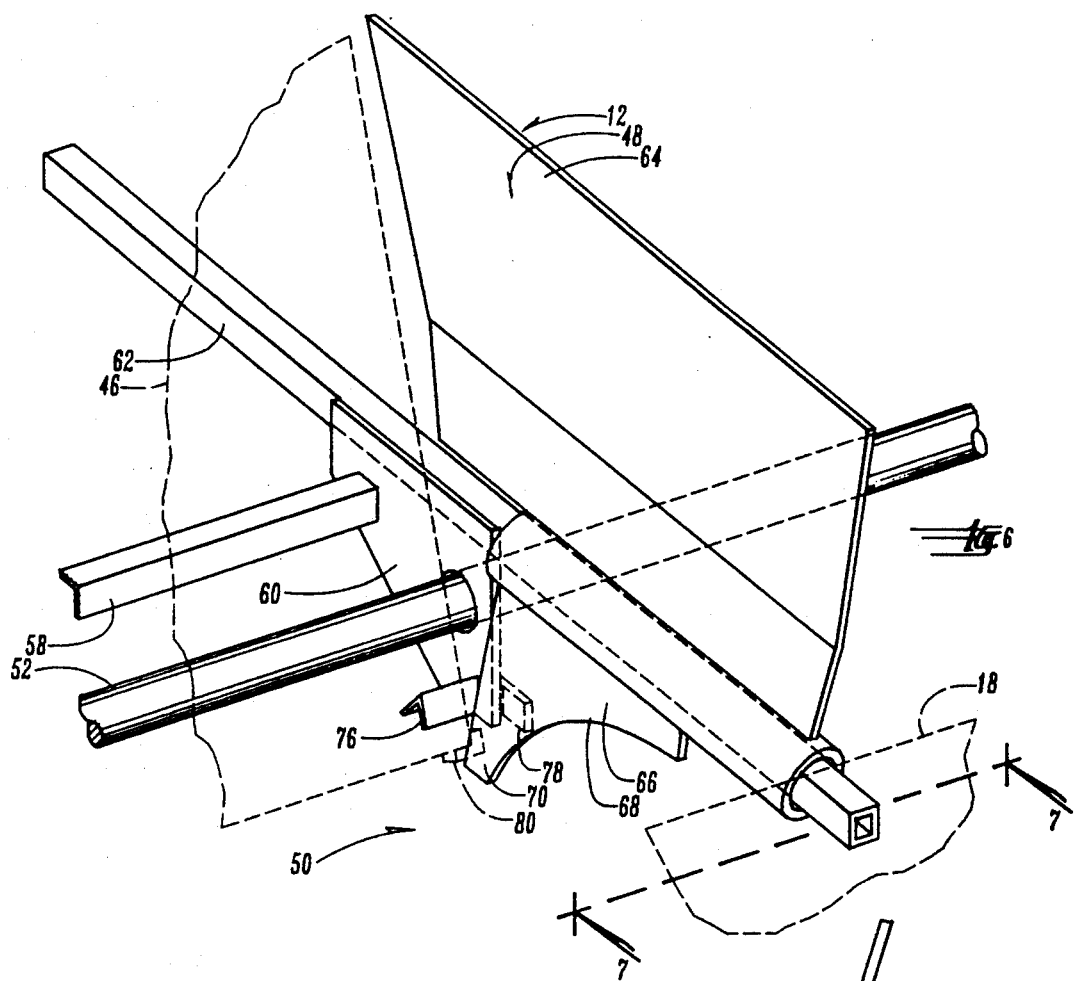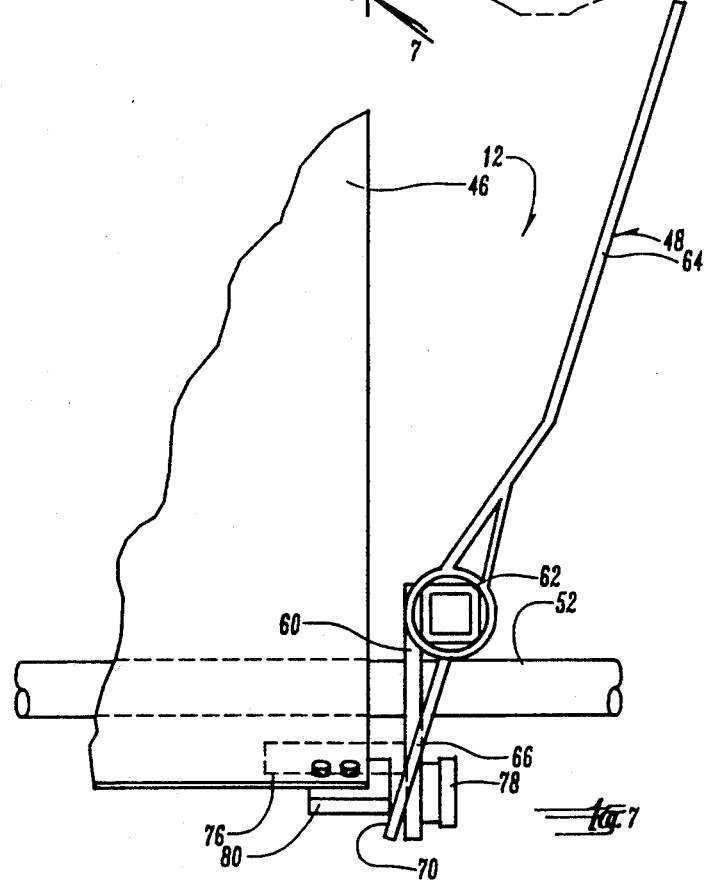

COMBINED HAY PROCESSOR AND FEED MIXER

BACKGROUND OF THE INVENTION

A very successful mixer for fluent and non-fluent material is disclosed in previously issued patents of which I am a coinventor or sole inventor, U.S. Pat. No. 4,506,990, Mar. 26, 1985; U.S. Pat. No. 4,597,672, July 1, 1986 and U.S. Pat. No. 4,756,626, July 12, 1988. The mixers of these patents include a rotor in a main mixing chamber next to vertically stacked augers in an auxiliary side chamber. The material is moved from one end of the auxiliary chamber to the other in opposite directions and is continuously cycled from the main chamber into the auxiliary chamber. The mixing action is more extensively described in these patents.

The mixer of these patents will mix fluent material with non fluent hay material which is more difficult to mix as it is necessary that the hay be left in the mixer for extended periods of time until it has been sufficiently chopped or shredded. It is often desirable to put hay bales of varying sizes into the mixer for mixing with the fluent materials. What is needed is a faster, more effective way of chopping or processing the baled hay for mixing with the fluent materials.

SUMMARY OF THE INVENTION

It has been found that by placing knives on the outer edge of the auger flighting of the top auger and varying the pitch and speed of rotation of the auger an effective chopping or processing of baled hay can be accomplished. The mixer of this invention includes a hay feed system including a longitudinally extending feed wall in the mixer chamber having a lower edge positioned closely adjacent to the upper chopping or processing auger. A control wall extends laterally across the chamber from the feed wall to the adjacent chamber side wall thus assuring that all hay is worked upon by the chopper auger before it reaches the mixing auger below it or the rotor in the main chamber. The feed wall and the control wall may be rotated on supporting frame members to a horizontal position for transport or storage where there are height restrictions. The pivoting of the feed wall and control wall are coordinated by the lower corner of the feed wall engaging the control wall when in the horizontal position such that pressure is applied to the control wall moving it to a substantially vertical position as the feed wall is moved to a substantially vertical position. Stops are provided to limit further pivotal movement of both walls. If heighth is not a concern, the feed wall and control wall may be fastened in a permanent vertical position.

The hay feed system of this invention is adaptable for use on not only the mixer disclosed in this application, but also feed mixers of a more conventional design.

DESCRIPTION OF THE DRAWINGS

FIG. 1 is a perspective view of a mixer which includes the hay feed system attachment of this invention.

FIG. 2 is a cross sectional view taken along line 2—2 in FIG. 3.

FIG. 3 is a top plan view thereof.

FIG. 4 is a fragmentary exploded perspective view of the hay feed system attachment.

FIG. 5 is a view similar to FIG. 4 but showing the feed wall and control wall in lowered positions.

FIG. 6 is an enlarged fragmentary perspective view as indicated by the line 6—6 in FIG. 4.

FIG. 7 is a cross sectional view taken along line 7—7 in FIG. 6.

FIG. 8 is a cross sectional view taken along line 8—8 in FIG. 3.

FIG. 9 is a rear end elevational view of the mixer.

DESCRIPTION OF PREFERRED EMBODIMENT

A mixer 10 is shown in FIG. 1 which includes the hay feed system attachment 12 of this invention.

The mixer 10 includes opposite end walls 14 and 16, opposite side walls 18 and 20 and a bottom wall 22. A rotor 24 is positioned in a main chamber 26 and includes rotor arms 28 which have rotor bars 30 extending therebetween. A chopping and mixing auger 32 is positioned in an auxiliary chamber 34 above a lower mixing auger 36. The chopper auger 32 includes flighting 38 having spaced apart sickle knives 40 on the outer edge with a spacing of one or more knives for each 360°. Paddles 42 are provided on the shaft 44 of the chopper auger 32 as seen in FIG. 3 for stirring the material and distributing it throughout the mixing chambers 26 and 34.

The hay feed system attachment 12 includes a feed wall 46 extending longitudinally of the mixer 10 and a control wall 48 extending laterally of the auxiliary chamber 34 to define in cooperation with the side wall 18 a hay chopping chamber 50 as seen in FIG. 3. The hay chopping chamber 50 is in the upper region of the auxiliary chamber 34 where the chopper auger 32 is positioned.

The feed wall 46 is mounted on a pivot shaft frame member 52 extending between the opposite end walls 14 and 16 of the mixer 10. A mounting end plate 54 secures the pivot shaft 52 to the end wall 16 as does a mounting plate 56 connects the opposite end to the end wall 14. A second longitudinal frame member 58 extends between the mounting end plate 54 and a support plate 60 through which the pivot shaft 52 extends as seen in FIG. 4. The support plate 60 is connected to a transversely extending frame member 62 extending between the mixer side walls 18 and 20. The control wall 48 is pivotally mounted on the frame member 62 and includes an upper portion 64 and a lower portion 66 which includes a concave downwardly edge 68 to conform to the convex shape of the chopper auger 32. The lower edge 70 of the feed wall 46 is also positioned closely adjacent to the periphery of the chopper auger 32 to assure that hay bales 72 are fed through the chopper auger 32 before the hay reaches the lower mixing auger 36 or rotor 24.

A stop 74 is provided on the mounting end plate 54 and a stop 76 is provided on the support plate 60 to limit pivotal movement of the feed wall 46 beyond the upstanding position illustrated in the drawings. It is seen, however, that the feed wall 46 extends downwardly and laterally towards the side wall 18 and the chopper auger 32. A stop plate 78 extends laterally outwardly from the support plate 60 to limit pivotal movement of the control wall 48 beyond the substantially vertical position as shown in FIG. 6.

Cooperation between the pivotal movement of the feed wall 46 and the control wall 48 results from the lower corner of the feed wall 46 adjacent the control wall 48 engaging the lower portion 66 of the control wall 48 when the feed wall 46 and control wall 48 are both in their horizontal positions as seen in FIG. 5. Pivotal movement to a raised position of the feed wall 46 thus causes the control wall 48 to also pivot to its substantially vertical position. A block 80 is mounted on the lower corner of the feed wall 46 and provides the contact with the lower portion 66 of the control wall 48 as seen in FIG. 6.

Operation of the pivoting of the feed wall 46 and control wall 48 is through use of a winch 82 as seen in FIG. 9 connected through a cable 84 routed over a guide pulley 86 and thence to a pivot arm 88 mounted on the pivot shaft 52 connected to the feed wall 46. When tension is placed on the cable 84 the feed wall 46 is pivoted to its substantially vertical position as seen in FIG. 9. When the cable 84 is released, the balance of the feed wall 46 is such that gravity will return it to its horizontal position of FIG. 5. The same is true with the control wall 48 which is raised to its substantially vertical position by pressure of the block 80 against the lower portion 66 of the control wall 48. A hydraulic cylinder can be substituted for the cable system, or the feed wall 46 and the control wall 48 may be constructed in a fixed vertical position.

The desired amount of chopping action on the hay bales 72 when in the hay chopping chamber 50 is determined by the speed of the chopper auger 32, the number of sickle knives used on each 360° rotation of the auger, the pitch of the flighting 38 which effects the length of time the hay is in the hay chopping chamber 50, and the diameter of the tubing on which the auger flightings are mounted. A pair of control arms 90 are removably mounted on the top edge of the side wall 18 and extend over the chopper auger 32 to restrict movement of the hay by the chopper auger 32. The control wall 48 restricts flow of hay over the top of the chopper auger 32. Once the hay has been chopped into small enough pieces to pass through the chopper auger or under the control wall 48, it is acted upon the by paddles 42 as seen in FIG. 3 whereupon it is distributed downwardly to the mixing auger 36 and laterally into the main chamber 26 for further mixing action by the rotor 24.

What is claimed is:

1. A combined hay processor and feed mixer comprising,
   a chamber having upper and lower zones, opposite end walls,
   opposite side walls, a bottom wall and an open top, mixing means in the lower zone of said chamber, a longitudinally extending hay chopper auger in the upper zone of said chamber, and
   a hay feed system in the upper zone of said chamber above said hay chopper auger for channeling hay into said hay chopper auger.

2. The structure of claim 1 wherein said hay feed system includes a feed wall extending longitudinally of and substantially vertically in and above said chamber and is positioned between said opposite side walls of said chamber.

3. The structure of claim 2 wherein said feed wall has a lower longitudinal edge positioned closely adjacent to said hay chopper auger along the length of said feed wall.

4. The structure of claim 3 wherein said hay chopper auger is positioned adjacent one of said opposite side walls and said feed wall is positioned on the opposite side of said hay chopper auger from said one side wall.

5. The structure of claim 4 wherein said feed wall is disposed at an angle to a vertical longitudinally extending plane and extends downwardly towards said hay chopper auger and said one side wall.

6. The structure of claim 5 wherein said feed wall extends substantially above said open top of said chamber.

7. The structure of claim 2 wherein said feed wall is pivotal between an upstanding position when extending substantially vertically and a horizontal lowered position over said open top.

8. The structure of claim 2 and a substantially vertically positioned flow control wall extends between said feed wall and said one wall of said chamber and adjacent to said hay chopper auger to limit longitudinal flow of hay over said hay chopper auger.

9. The structure of claim 8 wherein said flow control wall is pivotal between said substantial vertical position to a lowered horizontal position.

10. The structure of claim 8 wherein said feed wall is pivotal between an upstanding position when extending substantially vertically and a horizontal lowered position over said open top.

11. The structure of claim 10 and cooperating means is provided on both said feed wall and said flow control wall to pivot each to said substantially vertical positions together.

12. The structure of claim 11 wherein said cooperating means is defined as being a lower end corner of said feed wall adjacent said flow control wall engaging said flow control wall during pivotal movement from said horizontal positions to said substantially vertical positions.

13. The structure of claim 12 wherein power means is connected to said feed wall to pivot it between said lower horizontal position to said substantially vertical position.

14. The structure of claim 8 wherein said flow control wall includes a lower longitudinal edge having a concave shape to substantially conform to the shape of said feed chopper auger.

15. The structure of claim 10 and stops are provided to limit pivotal movement of both said feed wall and flow control wall when pivoting to said substantially vertical positions.

16. The structure of claim 8 wherein said flow control wall is spaced longitudinally inwardly from an adjacent opposite end wall of said chamber.

17. The structure of claim 16 wherein said hay chopper auger includes flighting having an outer edge with a series of knives mounted on the outer edge of said flighting.

18. The structure of claim 16 wherein at least one mixing auger is positioned longitudinally of said chamber below said hay chopper auger.

19. The structure of claim 18 and a rotor including a plurality of elongated rotor bars adjacent the outer periphery thereof is positioned longitudinally in said chamber between said chopper auger and one of said opposite chamber side walls whereby said feed wall, said control wall and said other side wall channel all hay into said chopper auger.

20. The structure of claim 8 wherein at least one control arm is connected to the side wall of said chamber adjacent said chopper auger and extends transversely of said chamber over said chopper auger towards said feed wall and is positioned between said control wall at one end of said feed wall and the end wall of said chamber at the opposite end of said feed wall.

* * * * *